United States Patent [19]

Lindholm

[11] Patent Number: 5,216,713
[45] Date of Patent: Jun. 1, 1993

[54] METHOD AND APPARATUS FOR PREVENTING EXTRANEOUS DETECTION OF SIGNAL INFORMATION

[75] Inventor: Per Lindholm, Stockholm, Sweden

[73] Assignee: Shield Research in Sweden, Stockholm, Sweden

[21] Appl. No.: 824,093

[22] Filed: Jan. 22, 1992

[30] Foreign Application Priority Data

Jun. 24, 1991 [SE] Sweden ............................. 9101952-1

[51] Int. Cl.$^5$ .............................................. H04N 1/02
[52] U.S. Cl. ............................................ 380/7; 380/6; 380/48; 380/10; 455/1
[58] Field of Search .................... 380/6, 7, 8, 9, 10, 380/48, 49; 455/1

[56] References Cited

U.S. PATENT DOCUMENTS

| | | | |
|---|---|---|---|
| 4,225,962 | 9/1980 | Meyr et al. ............................ | 380/9 X |
| 4,563,546 | 1/1986 | Glitz ...................................... | 380/8 |
| 4,697,157 | 9/1987 | Buddecke et al. .................... | 455/1 X |
| 5,086,467 | 2/1992 | Malek .................................... | 380/6 |
| 5,157,725 | 10/1992 | Lindholm .............................. | 380/9 |
| 5,165,098 | 11/1992 | Hoivik ................................... | 380/8 |

FOREIGN PATENT DOCUMENTS 0240328 7/1987 European Pat. Off. .

OTHER PUBLICATIONS

Smiley, Charles; "Exchange data between digital systems"; *Electronic Design*, vol. 25 No. 9; Apr. 26, 1977 pp. 96-98.

Nachtmann, Loys; "Modeme Datenspionage"; Chip; Nr 11, Nov. 1986; pp. 252-254.

*Primary Examiner*—Tod R. Swann
*Attorney, Agent, or Firm*—Oblon, Spivak, McClelland, Maier & Neustadt

[57] ABSTRACT

In a method of preventing extraneous detection of signal information from raster scan signals in a plurality of consecutive line signals intended to form an image or partial images there is generated a random signal sequence, correlated with the information-carrying raster scan signals, but without information content, which is transmitted as protection for the raster scan signals. An apparatus for this purpose includes a generator (10,12) adapted for generating a random signal sequence synchronous with the raster scan signals, and a switching element (5) adapted to transmit the random signal sequence round the equipment containing the raster scan signals that are to be protected.

14 Claims, 3 Drawing Sheets

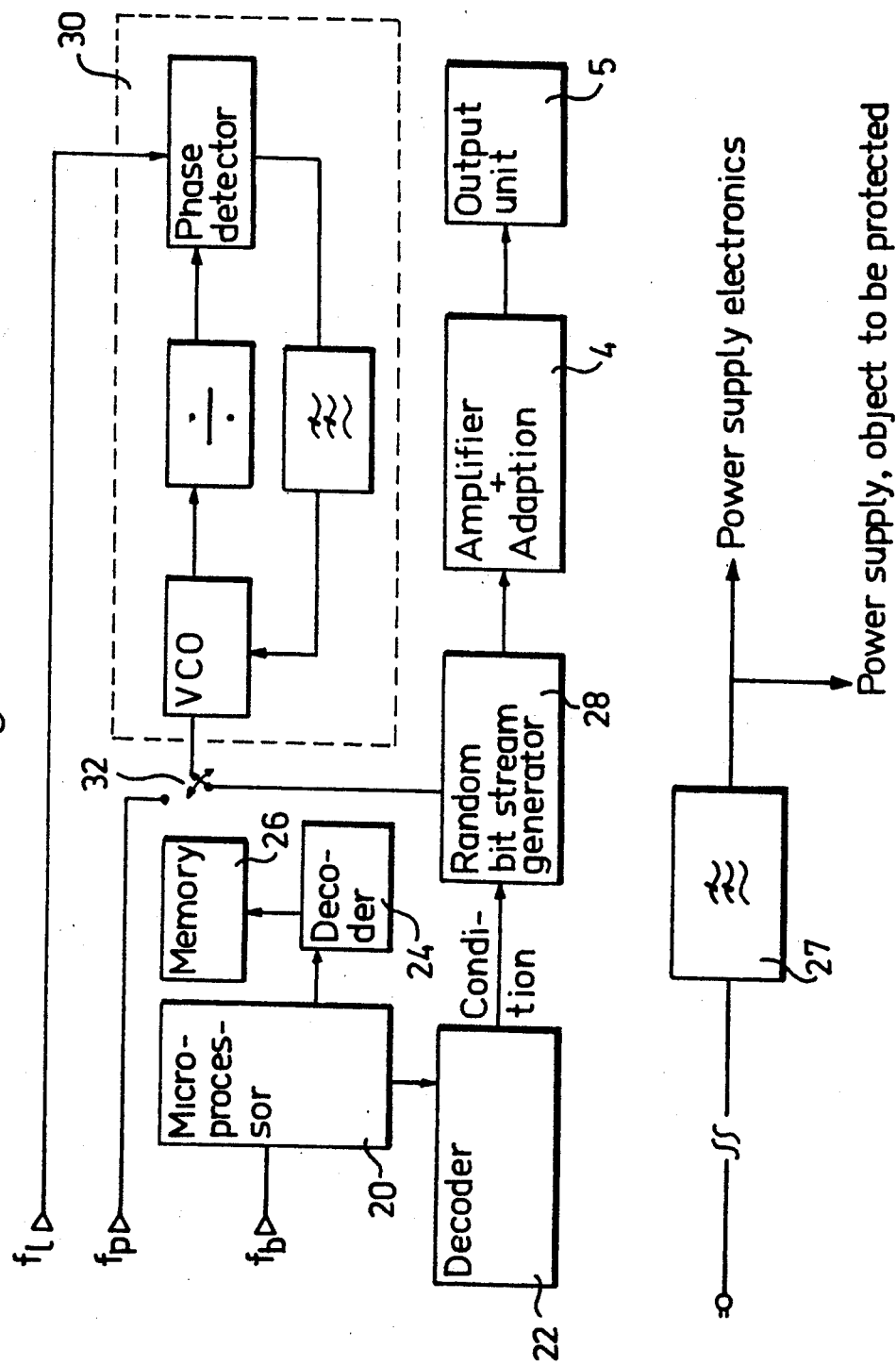

METHOD AND APPARATUS FOR PREVENTING EXTRANEOUS DETECTION OF SIGNAL INFORMATION

BACKGROUND OF THE INVENTION

1. Field of the Invention

The present invention includes a method and apparatus for preventing extraneous detection of signal information from raster scan signals in a plurality of consecutive line signals intended to form an image or partial image.

DISCUSSION OF THE RELATED ART

Raster scan signals maybe divided into video, telefax and laser print signals. Common to all of these signal types is that an image or text page is built up from a plurality of consecutive lines, the least element of which comprises image dots, i.e. pixels. A special case of such raster scanned signals is video signals, the latter also having, apart from the consecutive lines, a consecutively repeated image field. The raster scanned signals result in high information redundancy.

Raster scanned signals in display screens, laser printers, telefaxes and other computer and IT equipment contain radio frequency components, which are radiated to the surroundings and are propagated through the air and via conductors connected to the object in question, or situated close to it. The information content in these signals can be intercepted and interpreted remotely, without the user noticing anything, which is a great hazard to data security.

A previously known method of reducing the emission of these information signals is to encapsulate and screen the equipment, so that only negligible signal levels reach the surroundings. This technique is however only utilisable for newly manufactured equipment, and is generally very expensive, both in production and maintenance.

It is also previously known to emit around the equipment an interference signal having the characteristic of white noise. This technique is also burdened with considerable drawbacks. The protective effect that can be achieved by this method is thus limited, since the collective mean value of white noise is zero the mean value formation will reduce the protective effect obtained.

A still further known method of protecting signal information is to transmit a bit stream sequence of pseudo-random character, the clock signals thereof being of the same order of magnitude as the display screen pixel clock frequency but frequency modulated, see SE,B, 8900288-5. There are weaknesses in the protection obtained by this method as well, as signal processing with mean value formation is used.

SUMMARY OF THE INVENTION

The object invention is to provide a method and achieve an apparatus for preventing, in a considerably more effective way, the extraneous detection of signal information in raster scan signals.

This object is obtained by a method and apparatus of the kind mentioned in the introduction and having the distinguishing features disclosed in claims 1 and 8, respectively.

With the present invention there is thus generated a random signal sequence perfectly correlated to the raster scanned information-carrying signals which is transmitted as protection for the raster scanned signals.

While uncorrelated signals may be comparatively easily filtered off, correlated signals are difficult to filter and accordingly can not be filtered by mean value formation.

According to a first advantageous embodiment of the method according to the invention the starting condition for the random signal sequence of output data is determined by calculation of a so-called chaos algorithm, according to the principles given by Alan Rodney Murch, "Technological Applications of Deterministic Chaos", University of Canterbury, Christchurch, New Zealand, July, 1989.

According to a second advantageous embodiment of the method according to the invention, the bit frequency of the random signal sequence is selected so as to be exactly equal to the bit frequency of the raster scan signal, i.e. equal to the pixel clock frequency.

According to a third advantageous embodiment of the method according to the invention, the length of random signal sequence is selected to be of a length requiring it to be truneated at termination of the image.

According to a fourth advantageous embodiment of the method according to the invention, the relevant part of the random signal sequence is repeated for consecutive image signals or partial image signals, while maintaining perfect synchronisation with the raster scan signal pixel clock frequency, thus creating correlation between the raster scan signal and random signal sequence.

According to a fifth advantageous embodiment of the method according to the invention, the random signal sequence is created such as to have stochastic properties during a period of the raster scan signal. If the raster scan signal is repeated, as is the case with video signals, the random signal sequence will be repeated a random number of times between 50 and 10,000 to give the random signal sequence a time mean value different from zero, as seen over a plurality of consecutive image signals, as well as to further reinforce the correlation with the raster scan signals.

In accordance with a first advantageous embodiment, sparing of components, of the apparatus according to the invention, the apparatus comprises a generator for producing the random signal sequence, which generator includes a microprocessor and a shift register of so-called maximum length feedback kind, which shift register is made up from individual feedback shift registers of a plurality such that the repetition cycle exceeds the time for generating the number of pixels per image, said microprocessor being adapted to generate new starting conditions for the shift registers.

In accordance with a second advantageous embodiment of the apparatus according to the invention, an adaption unit is arranged between the generator and switching element to enable adjustment of the output signal level as a function of the frequency. It is thus possible to adjust the output signal level through different frequency ranges, so that the signal level of the generated random bit frequency is equal to or higher than the level of the signal to be protected.

In accordance with a third advantageous embodiment of the apparatus according to the invention, the switching element is formed as a current transformer with a ferrite core surrounding the conductor carrying the raster scan signals. The primary winding of the current transformer carries the output signal, which generates currents on the secondary side screen, whereby the same radiated structure is utilised as for the raster scan signal, which means that the random bit sequence is emitted to the surroundings with the same radiation characteristic as the information-carrying signal.

In accordance with a fourth advantageous embodiment of the apparatus according to the invention, the switching element includes a folded wideband dipole with a monopole situated close to an earth plane, thus obtaining an all-round radiating, isotropic characteristic.

BRIEF DESCRIPTION OF THE DRAWINGS

Embodiments of the apparatus according to the invention, selected as examples, will now be described in more detail, and with reference to the accompanying drawings, on which FIG. 3 illustrates a further embodiment of the apparatus according to the invention.

DETAILED DESCRIPTION OF THE PREFERRED EMBODIMENTS

Figure 1:
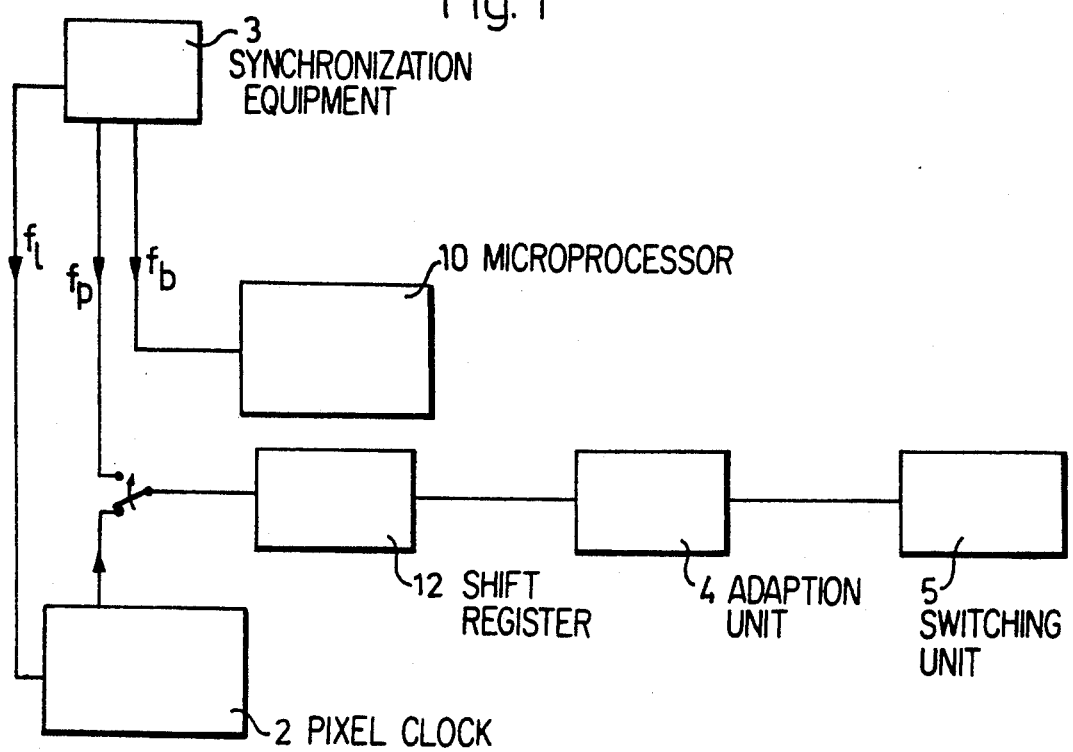
FIG. 1 illustrates the construction principle of an embodiment of the apparatus according to the invention

The apparatus according to the invention contains the following main parts:

A generator for generating the random bit stream in the formation of the random signal sequence, a phase-locked pixel clock generator, inputs for synchronisation signals, an adaption unit and a switching element.

The generator has the task of generating a random bit sequence in time with the pixel clock. The pixel clock can be received via a separate input to the unit 3 in FIG. 1, or clocking can be generated synthetically at 2 in the FIG. The generated random bit sequence is fed to a switching element 5 via an adaption unit 4.

The generator includes a microprocessor, 10, the output data from which are fed to a shift,, register 12. The shift register 12 may be realised as a parallel input serial output (PISO) register or as a so-called maximum length feedback shift register. The maximum length feedback shift register then forms within itself a pseudo-noise (PN) generator. The condition for obtaining a random output signal from the PN generator is that the output signal within the clock pulse range $1,2 \ldots N-1$ is solely utilised, where N denotes the number of individual shift registers forming the PN generator.

Shift registers are necessary to cope with high pixel clock frequencies. In the case where the invention is to be used for protecting video signals from computer terminals, for example, the apparatus must cope with pixel clock frequencies of 40 MHz or more.

In the case where the shift register 12 is of the PISO type, according to the above, the microprocessor 10 calculates a random number with the aid of a random number algorithm. If it is assumed that the microprocessor 10 needs ten clock cycles to go through the algorithm, the effective random number generation will take place at a tenth of the clock frequency of the microprocessor, i.e. 1 MHz. If the PISO register is to handle pixel clock frequencies of 50 MHz, a PISO register of at least 40 bits is consequently required. If it is assumed that such a 40-bit PISO register is utilised, the microprocessor must consequently charge a new random number after 40 clock pulses. This is repeated until the microprocessor receives an interruption signal at image termination. The interruption signal is obtained via the unit 3 in FIG. 1.

The function described above is equal for all types of raster scan signals, although the procedure will be somewhat expanded in the special case with video signals.

Video signals are distinguished by the whole, or part of the image information being repeated with a repetition frequency of about 50–100 Hz. In the following this frequency is called the image frequency. For the random bit sequence to obtain properties similar to those of the video signal, it is required that the time mean value over a plurality of consecutive image intervals is different from zero. This means that the generated bit stream sequence is repeated a number of times. From the cryptological aspect, it would appear to be favorable if the number of repetitions is randomly and uniformly distributed within the interval 40–5000.

A solution more sparing of components is achieved by forming the shift register as a so-called maximum length feedback shift register. In this case, the number of individual feedback shift registers must be high enough for the repetition cycle to exceed the number of pixels per image. The task of the microprocessor 10 in this case is to generate new starting conditions for the shift registers and to process interruption at image termination.

Figure 2:
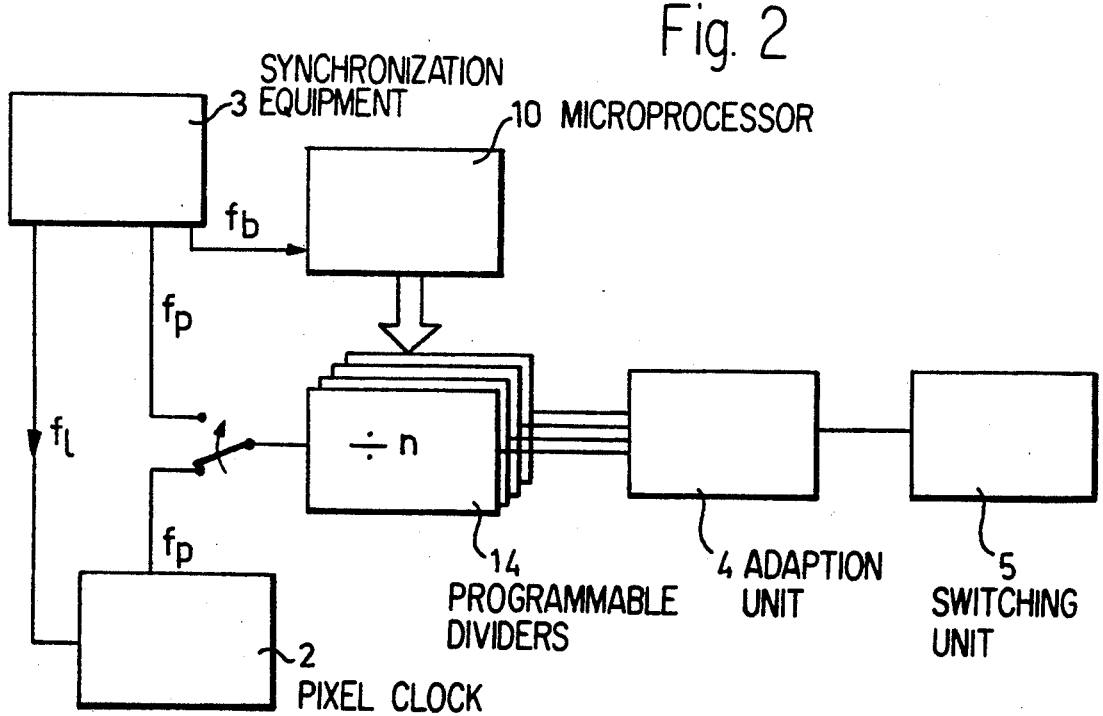
FIG. 2 shows the principal construction of another embodiment of the apparatus according to the invention.

Another way of realising the generator in the apparatus according to the invention is to merge the output signals from an arbitrary number of programable dividers, 14, which are clocked from the pixel clock 2, see FIG. 2. The programable dividers 14 are programed from a microprocessor 10 with a plurality of integers that are randomly generated by implementing a random number algorithm in the microprocessor 10, and with which the frequency of the pixel clock 2 is divided down in the respective divider 14. When the signals (pulse trains) obtained from the different dividers 14 are merged or added in the unit 4 a resulting output signal is obtained, which can be said to represent a "grey scale" for the transmitted video signal, and when the dividers 14, during the random number generation of the microprocessor 10, perform the dividing down with precisely the instant number, there is generated a synchronised signal quantity, which varies as new numbers are entered. In this way, long random number sequences may be generated using a microprocessor having a limited rate.

In the embodiments illustrated in FIGS. 1 and 2, a phase-locked pixel clock generator 2 is utilised to synthesize the pixel clock frequency from the line frequency. This is necessary, since the pixel clock can not be received directly via galvanic coupling, as is the case when e.g. telefax apparatus and data terminals are to be protected.

Separate inputs to the synchronisation equipment 3 in Figs 1 and 2 are utilised to ensure perfect synchronisation with the protected object. Inputs to the synchronisation equipment are available for the image frequency $f_b$, line frequency $f_l$ and pixel frequency $f_p$.

In FIG. 3 there is illustrated another embodiment in the form of a block diagram, wherein a microprocessor with associated decoding units 22, 24 and memory 26 generate starting conditions for a random bit stream generator 28. The random bit stream genarator 28 may also in this case be along maximum length feedback shift register. The pixel clock frequency is generated in a pixel clock generator including the elements in the dashed rectangle 30 of FIG. 3, or can be taken directly to the random bit stream generator 28 via the switch 32. This is a method of realising the invention more demanding of software, whereas the embodiment according to FIG. 2 demands more hard-ware, inter alia with a greater number of dividers.

In all the embodiments according to FIGS. 1 through 3 there is an adaption unit after the random bit stream generator to enable individual adjustment of the output signal level as a function of the frequency, so that the output signal level within different frequency ranges will be equal to, or higher than the level of the information-carrying signal that is to be protected. The adaption unit 4 includes, inter alia, filter links.

After the adaption unit 4 there is a switching unit 5, which can be implemented in different ways.

A certain part of the information-carrying signal will propagate on the line, e.g a power line, when the signal radiates out, inter alia on to metallic conductors. To minimise this effect, a special filter 27 is cascade connected with the filter normally present in the computer for attenuating network noise. This is illustrated in the lower part of FIG. 3.

Figure 4:
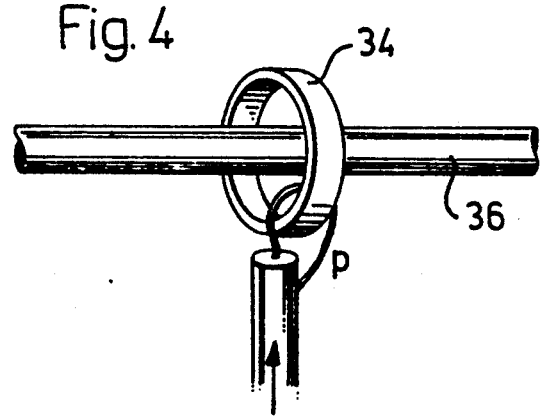
FIG. 4 illustrates a switching element for the apparatus according to the invention.

In FIG. 4 there is illustrated an example of the switching unit in the form of a current transformer. A ferrite core 34 surrounds the conductor 36, through which passes the information-carrying signal that is to be protected. The conductor 36 may thus be a video cable, data line etc.

The primary winding up of the current transformer conducts the output signal, which causes currents on the secondary side screen. There is thus utilised the same radiated structure as by the raster scan signal, which means that the random bit stream is radiated to the surroundings with the same radiation characteristic as the useful, information-carrying signal. This is an effective way of implementing the switching unit.

In accordance with an alternative embodiment of the switching unit 5, it includes a folded wideband dipole combined with a monopole, placed close to an earth plane. In this way there is realised a switching unit with an all-round radiating, isotropic characteristic.

The protective effect may be further improved by using several independent generators or shift register circuits for generating random bit sequences, the output signals of which are merged in the adaption unit.

With the present invention there is thus created a coherent signal quantity, which is also the case for the raster scanned signals. For consecutive image signals the signal quantity can be re-emitted during a random number of consecutive image intervals, thus generating a time mean value different from zero.

Since the emitted signal, as well as the raster scanned signal, is coherent the adjustment of the output signal level is facilitated, so that radio interference standards are complied with.

In utilising both white noise and frequency modulated pseudorandom number bit sequences according to prior art, the signals will be incoherent, which makes correct amplitude adjustment of the output signal more difficult, since coherent and incoherent signals behave differently on alteration of e.g. the measuring bandwidth.

Figure 5:
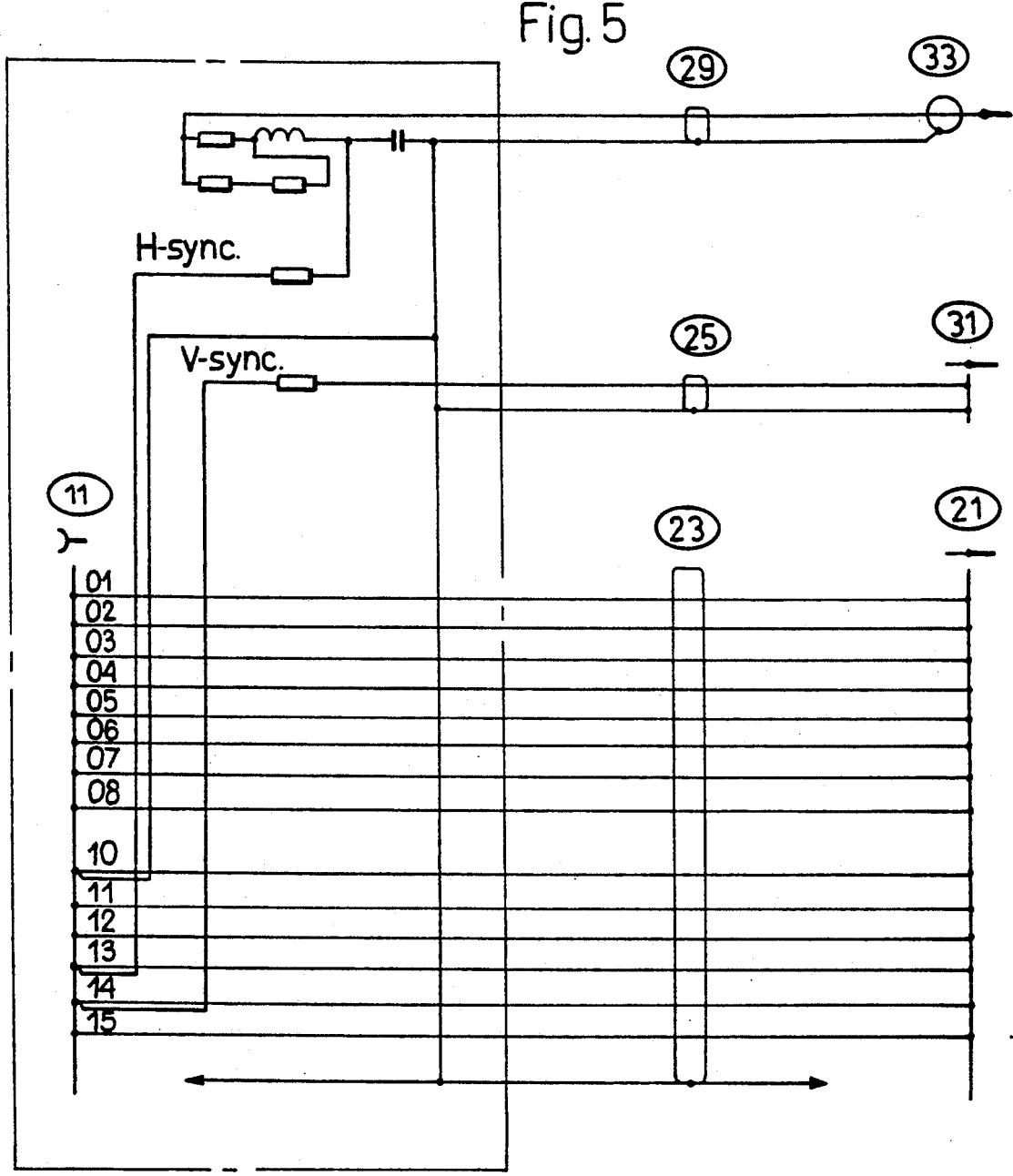
FIG. 5 is a circuit diagram for a switching element.

In FIG. 5 there is illustrated a circuit diagram of a practical implementation of a switching unit having a plurality of output signal lines 21, 31,33 to which the random signal sequence is connected via current transformers 23,25,29 of the kind illustrated in FIG. 4.

The video signal is connected via the contacts 11 from the computer to the monitor, the signals for horizontal and vertical synchronization being coupled galvanically via the coaxial cables 23 and 25, respectively. The resistors, capacitor and inductance illustrated in the upper part of the figure are arranged to avoid loading of the circuits driving the video signal, and for filtering out noise that can cause incorrect synchronization. This is not described in more detail, since it is not part of the invention.

I claim:

1. Method of preventing extraneous detection of signal information from raster scan signals in a plurality of consecutive line signals intended to form an image or partial images, characterized in that a random signal sequence is synchronized with the raster scan signals so as to have a bit frequency which is constant and equal to the bit frequency of the information-carrying raster scan signals but without information content, is generated and transmitted as protection for the raster scan signals.

2. Method as claimed in claim 1, characterized in that a starting condition for the random signal sequence is determined by calculation of a chaos algorithm.

3. Method as claimed in one of claims 1 and 2, characterized in that the random signal sequence is selected to be of such a length that it must be truncated at image termination.

4. Method as claimed in one of claims 1 and 2, characterized in that for consecutive image signals or partial image signals the relevant part of the random signal sequence is repeated while maintaining synchronization with the pixel clock frequency of the raster scan signal.

5. Method as claimed in one of claims 1 and 2, characterized in that the random signal sequence is executed such that it has stochastic properties during a period of the raster scan signal.

6. Method as claimed in one of claims 1 and 2, characterized in that for a repeated raster scan signal the random signal sequence is repeated a random number of times such as to give the random signal sequence a time means value different from zero.

7. Apparatus for preventing extraneous detection of signal information from raster scan signals in a plurality of consecutive line signals intended to form an image or partial images, characterized in that a generator is arranged to generate a random signal sequence sunchronized with the raster scan signals, and in that a switching element is adapted to transmit the random signal sequence around equipment containing the raster scan signals that are to be protected.

8. Apparatus as claimed in claim 7, characterized in that the generator includes a microprocessor connected to a shift register.

9. Apparatus as claimed in claim 8, characterized in that the shift register is formed as a PISO register, and in that the microprocessor is adapted to calculate random numbers with the aid of a random number algorithm.

10. Apparatus as claimed in claim 8, characterized in that the shift register is a maximum length feedback shift register of a sufficient number of individual feedback shift registers for the repetition cycle to exceed the number of pixels per image, the microprocessor being adapted for generating new starting conditions for the shift registers.

11. Apparatus as claimed in claim 7, characterized in that the generator is formed of a plurality of dividers clocked by the pixel clock, the dividers being programmed by the microprocessor with a plurality of integers generated by a random number algorithm in the microprocessor.

12. Apparatus as claimed in any one of claims 7-11, characterized in that an adaption unit is disposed between the generator and the switching element for enabling the adjustment of the output signal level as a function of the frequency.

13. Apparatus as claimed in any one of claims 7-11, characterized in that the switching element is implemented as a current transformer with a ferrite core surrounding the conductor that carries the raster scan signals.

14. Apparatus as claimed in any one of claims 7-11, characterized in that the switching element includes a folded wideband dipole with a monopole situated close to an earth plane.

* * * * *